United States Patent [19]

Evans

[11] Patent Number: 4,950,964

[45] Date of Patent: Aug. 21, 1990

[54] LOCOMOTIVE DIFFERENTIAL WHEEL SLIP CONTROL

[75] Inventor: Raymond G. Evans, Washington, Ill.

[73] Assignee: Caterpillar Inc., Peoria, Ill.

[21] Appl. No.: 337,237

[22] Filed: Apr. 13, 1989

[51] Int. Cl.$^5$ .............................................. B61C 15/08
[52] U.S. Cl. ........................................ 318/52; 318/66
[58] Field of Search .................. 318/52, 66, 67, 68, 318/69, 70; 364/426

[56] References Cited

U.S. PATENT DOCUMENTS

| 3,577,048 | 5/1971 | Nordin | 318/52 |
|---|---|---|---|
| 3,790,871 | 2/1974 | Smith | 318/52 |
| 3,898,937 | 8/1975 | Johnson | 318/52 X |
| 3,982,164 | 9/1976 | de Buhr et al. | 318/52 |
| 3,997,822 | 12/1976 | Logston, Jr. et al. | 318/52 |
| 4,065,975 | 1/1978 | Giessner | 73/510 |
| 4,095,147 | 6/1978 | Mountz | 318/52 |
| 4,136,303 | 1/1979 | Almquist et al. | 318/52 |
| 4,292,572 | 9/1981 | Ivy | 318/52 |
| 4,298,940 | 11/1981 | Tadokoro et al. | 318/52 X |
| 4,392,091 | 7/1983 | Roberts et al. | 318/71 X |
| 4,463,289 | 7/1984 | Young | 318/52 |
| 4,498,016 | 2/1985 | Earleson et al. | 290/40 |

FOREIGN PATENT DOCUMENTS 1123496  5/1982  Canada ..................... 341/74
56-25303  3/1981  Japan ....................... 318/52

OTHER PUBLICATIONS

Article titled "Microprocessor Control of Wheel Slip" published in May, 1985.

Primary Examiner—Bentsu Ro
Attorney, Agent, or Firm—Kirk A. Vander Leest

[57] ABSTRACT

Differential wheel slip control is desirable in a locomotive having wheels driven by a plurality traction motors which receive power from an engine driven generator. Wheel slip control in known systems involves increased cost and complexity resulting from sensors required to determine an actual locomotive or individual traction motor speeds. In the subject invention a microprocessor under software control is used to detect and control differential wheel slip. A difference signal is generated in response to a difference between the highest and lowest individual traction motor currents. A first-order-lag of the actual locomotive speed is calculated and compared to the difference signal. If the compared signals differ by more than a preselected reference, a differential slip condition exists and the generator power is reduced by a preselected magnitude. Generator power is continually reduced until the slip condition no longer detected.

16 Claims, 6 Drawing Sheets

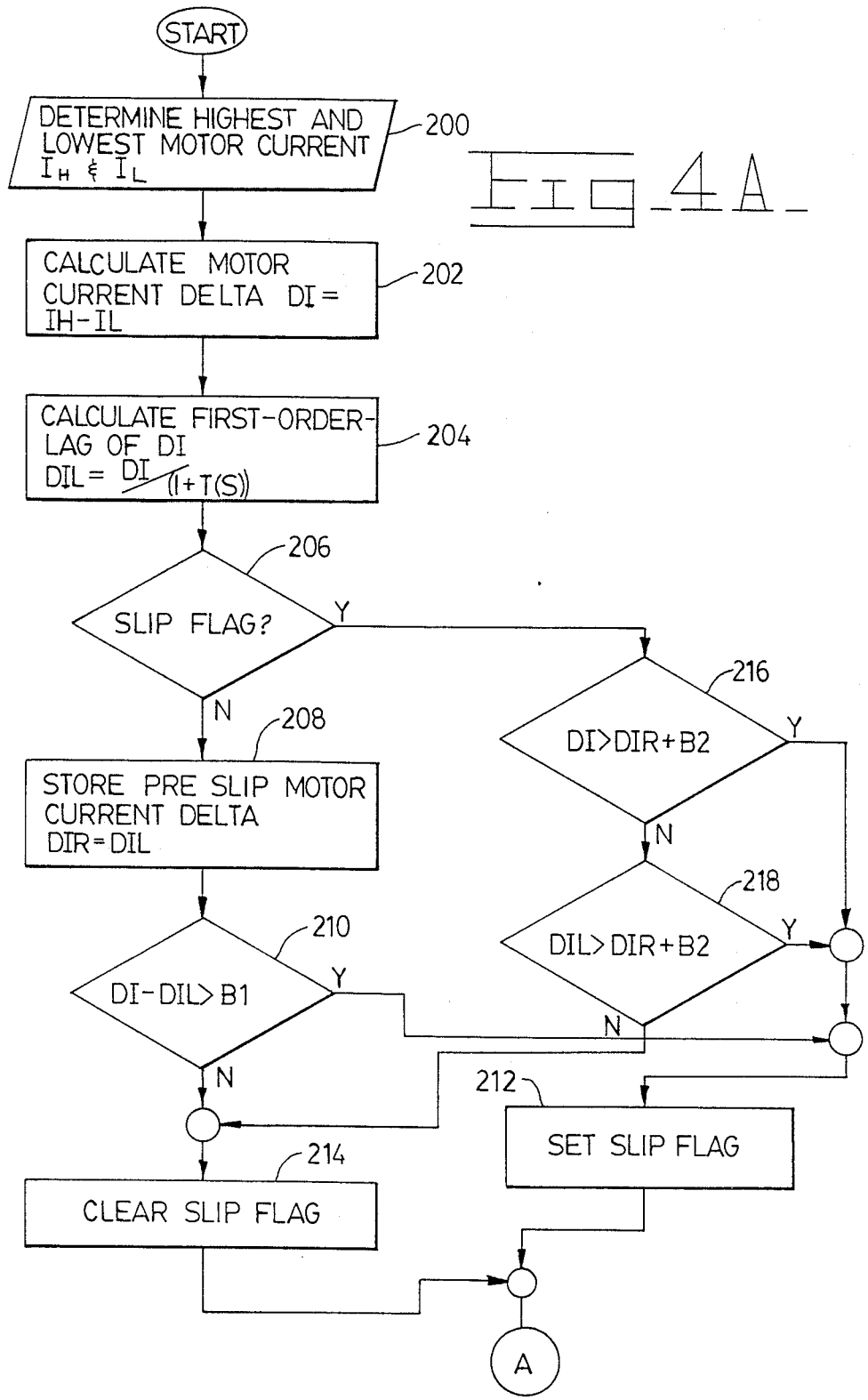
FIG_4A_

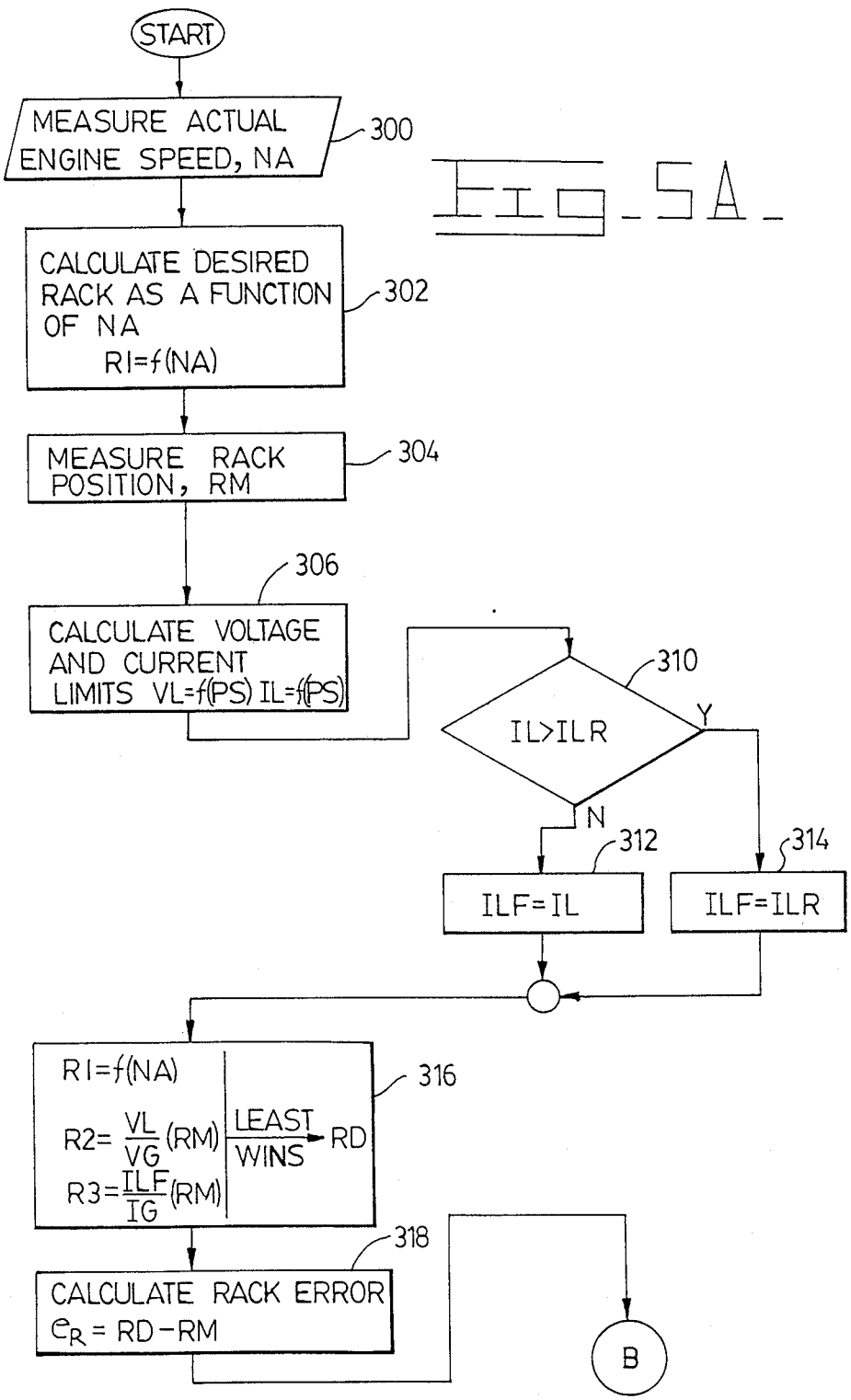
Fig_5A_

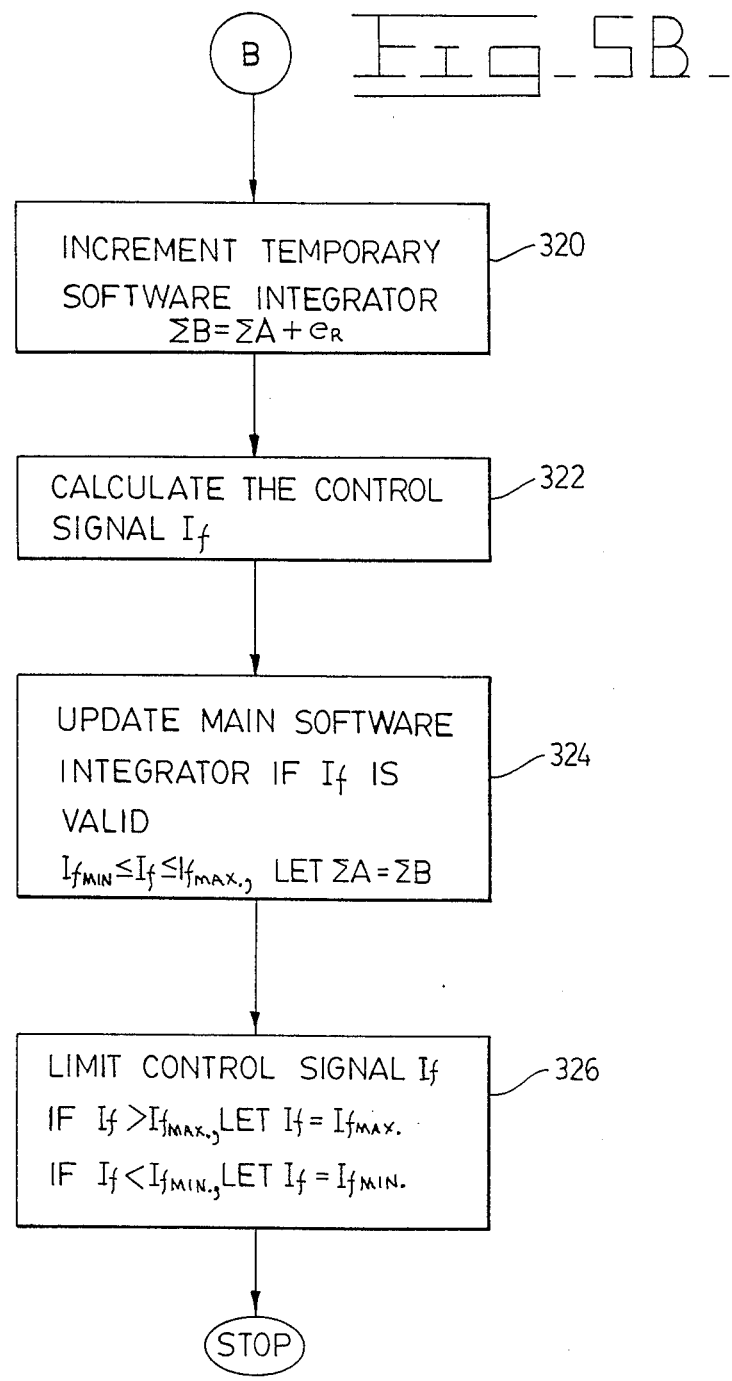

LOCOMOTIVE DIFFERENTIAL WHEEL SLIP CONTROL

TECHNICAL FIELD

The present invention relates to a system for detecting and controlling locomotive wheel slip and, more particularly, to a system for detecting and controlling differential wheel slip in a locomotive having a plurality electric traction motors powered by an engine generator unit controlled by a field current controller.

BACKGROUND ART

In a typical modern locomotive, a diesel engine is used to provide mechanical energy to a electric generator. The generator converts this mechanical energy into electrical power which is used to operate a plurality of direct current (dc) traction motors, each driving a separate drive axle having a pair of drive wheels connected thereto.

Wheel slip usually occurs during acceleration, and can take two forms. The first type, referred to as differential wheel slip, occurs when at least one set of drive wheels maintains tractive contact with the rail while at least one set of the remaining drive wheels slip. A second type of wheel slip is synchronous slip which occurs when none of the drive wheels maintains tractive contact with the rail and all of the drive wheels slip more or less simultaneously.

Wheel slip has long been a problem in locomotives and many systems have been developed which either reduce or completely eliminate wheel slip. A common scheme is to compare speed signals from driven and idler wheels or speed signals from each of several driven wheels or highest and lowest speed signals from traction motors. A slip condition is presumed to exist if the compared speed signals differ by more than a preselected magnitude. In the above mentioned systems, sensors, such as speed transducers, are used to produce the speed signals and such sensors add extra costs to wheel slip control systems.

An example of a wheel slip control system using speed sensors is disclosed in U.S. Pat. No. 4,463,289 issued July 31, 1984 to Young. In Young, the speeds of individual drive wheels are sensed and a differential signal is produced in response to a difference between the highest and lowest sensed wheel speeds. The differential signal is then compared to a creep reference signal to produce a slipping signal which is used to control generator output. The creep reference signal represents an amount of wheel slip at which maximum adhesion occurs. When a wheel begins to slip, the differential signal increases. This increases the slipping signal resulting in a reduction of the generator power.

The present invention is directed towards addressing the above mentioned problems by controlling differential wheel slip in a locomotive without requiring speed sensors. Other aspects, objects and advantages can be obtained from a study of the drawings, the disclosure, and the appended claims.

DISCLOSURE OF THE INVENTION

In accordance with one aspect of the invention there is provided an apparatus for controlling differential wheel slip of a locomotive having a plurality of electric traction motors powered by an engine-generator unit of the type having a field current controller. A motor current sensor senses the current through each of the traction motors and produces a plurality of motor current signals responsive to the sensed currents. A first comparator receives the motor current signals and produces a low logic signal responsive to the lowest motor current signal. A second comparator receives the motor current signals and produces a high logic signal responsive to the highest motor current signals. A processor receives the high and low logic signals, produces a motor current delta signal responsive to a difference between the high and low logic signals. Subsequently, the processor processes the motor current delta signal to produce a lagged motor current delta indicative of a first-order-lag of the motor current delta signal, derives a difference signal in response to a difference between the motor current delta and lagged motor current delta signals, and delivers a control signal to the field current control in response to the difference signal being greater than a preselected reference signal.

BRIEF DESCRIPTION OF THE DRAWINGS

FIG. 4a, and 4b are flowcharts of certain functions performed by an embodiment of the immediate differential wheel slip controller.

FIGS. 5a and 5b are flowcharts of certain functions performed by a locomotive governor which incorporates an embodiment of the immediate differential wheel slip controller.

BEST MODE FOR CARRYING OUT THE INVENTION

Figure 1:
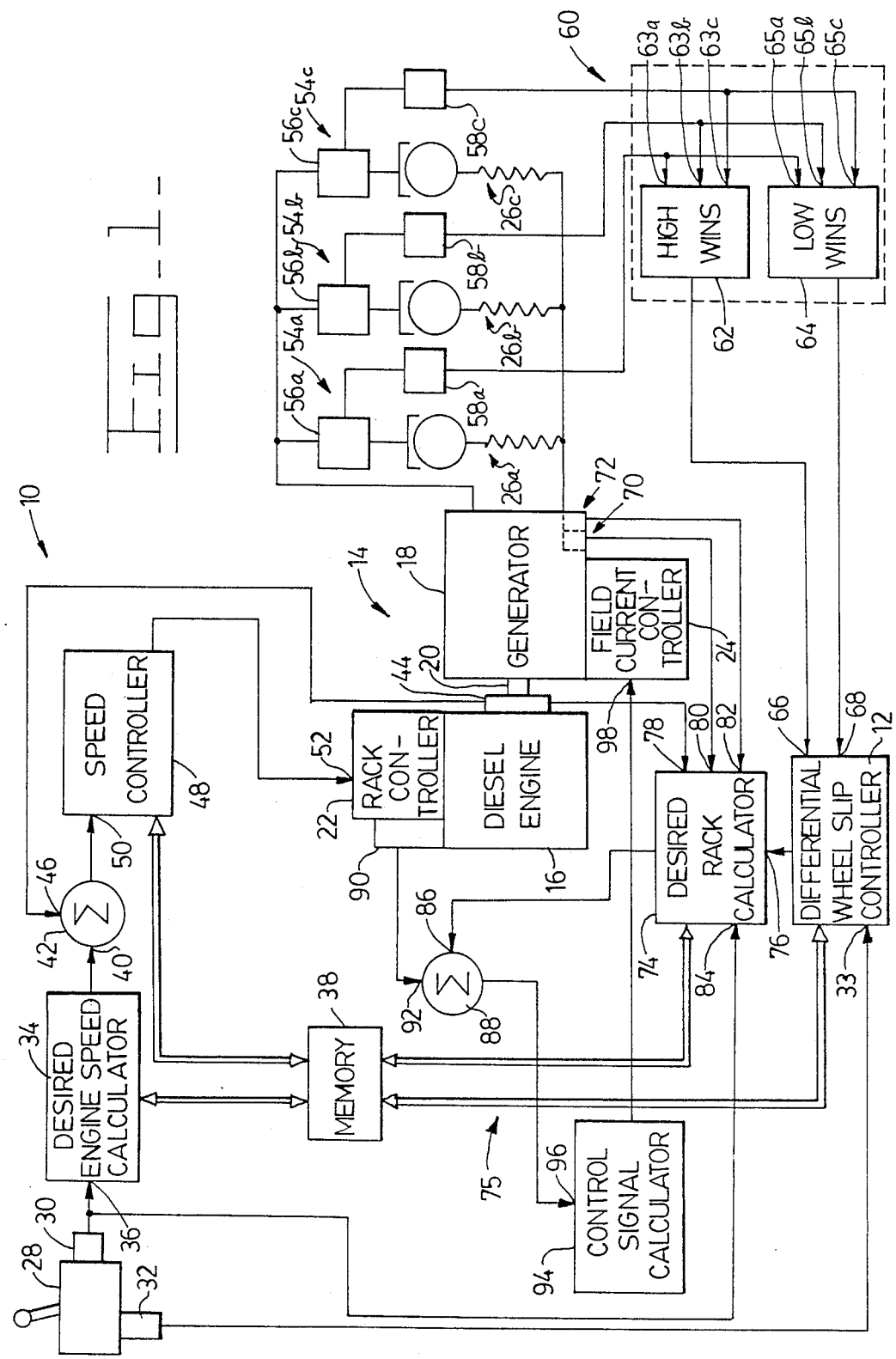
FIG. 1 is a simplified block diagram of a locomotive microprocessor governor incorporating an embodiment of the immediate differential wheel slip controller.

FIG. 1 illustrates a locomotive microprocessor governor control 10 which incorporates an embodiment of the immediate differential wheel slip controller 12. The microprocessor governor control 10 is similar to one disclosed in U.S. Pat. No. 4,498,016 issued on Aug. 4, 1983 to Earleson et al.; therefore, the governor control 10 will not be described extensively herein. The microprocessor governor control 10 is connected to an engine generator-unit 14 which includes a diesel engine 16 mechanically connected to drive a generator 18 by a drive shaft 20. The diesel engine 16 has a rack controller 22 for controlling the rate of fuel delivery to the engine 16. The generator 18 has a field current controller 24 for controlling power output thereof. The engine-generator unit 14 provides electrical power to a plurality of dc traction motors 26a–26c for driving a plurality of drive axles and drive wheels (not shown). In a typical case, the generator 18 produces an alternating current (ac) which is passed through a rectifier (not shown) to produce a dc current to power the traction motors 26a–26c.

A power selector 28, typically advanced in steps or "notches" by a human operator, is used to regulate the speed of the locomotive. In the preferred embodiment the power selector 28 has an idle notch and eight load notches. A selector sensor 30 is connected to the power selector 28 and produces a power signal in response to the position of the power selector 28. In the preferred embodiment the selector sensor 30 includes a system of electrical switches which produce a mathematically encoded four-bit output signal in response to the position of the power selector 28. It is apparent to those skilled in the art that this sensing function can be performed by any one of a number of devices such as a potentiometer, a transducer, etc.

An idle sensor 32 is connected to the power selector 28 and produces a load signal when the power selector is not in the idle position. In the preferred embodiment the idle sensor 32 is a switch that closes when the power selector 28 is positioned in one of the eight load notches. It is foreseeable that the power signal could also be used for determining when the power selector 28 is positioned in a load notch. The load signal is applied to an input terminal 33 of the differential wheel slip controller 12.

A desired speed calculator 34 has an input terminal 36 for receiving the power signal from the selector sensor 30. The desired speed calculator 34 accesses a first look-up table (not shown) stored in a memory 38. The first look-up table relates each notch setting to a desired engine speed and is used to produce a desired engine speed signal.

The desired engine speed signal is applied to one input terminal 40 of a speed summer 42. A magnetic pick-up sensor 44 is connected to the drive shaft 20 and produces an actual engine speed signal which is applied to a second input terminal 46 of the speed summer 42. It is apparent to those skilled that a device such as a tachometer can be used to produce the actual engine speed signal. The speed summer 42 produces a speed error signal $e_N$ in response to a difference between the actual and desired engine speed signals.

A speed controller 48 has an input terminal 50 for receiving the speed error signal $e_N$ from the speed summer 42. The speed controller 48 accesses a fuel delivery rate formula stored in the memory 38 and uses the formula to produce a fuel delivery rate signal as a function of the speed error signal $e_N$. The fuel delivery rate signal is applied to an input terminal 52 of the rack controller 22 to regulate actual engine speed so as to reduce the engine speed error $e_N$ signal to zero.

A plurality of motor current sensors 54a-54c sense the current through the traction motors 24a-24c and produce motor current signals responsive to the sensed currents. In the preferred embodiment the motor current sensor includes a transductor 56a-56c for producing an ac current signal proportional to the sensed motor current and a first module 58a-58c for converting this ac current signal to a dc voltage signal.

A comparator module 60 receives the motor current signals and produces high and low logic signals in response to the highest and lowest motor current signals, respectively. In the preferred embodiment the comparator module 60 includes a high wins circuit 62 which has input terminals 63a-63c for receiving each of the motor current signals. The high wins circuit 62 produces a high logic signal in response to the highest motor current signal. Likewise, a low wins circuit 64 has input terminals 65a-65c for receiving each of the motor current signals. The low wins circuit 64 produces a low logic signal in response to the lowest motor current signal. In the event that one of the traction motors is disconnected by the operator, a switched input signal is provided by a circuit (not shown) causing the the low wins circuit 64 to ignore the motor current signal for the disconnected motor.

Subsequently, the comparator module 60 amplifies the high and low logic signals to a level that is usable by the microprocessor governor control 12. In the preferred embodiment the microprocessor governor control 12 uses signals ranging from 0 to 50 volts dc. Furthermore, the comparator module 60 is embodied in hardware; however, it is recognized by those skilled in the art that the high and low wins functions could be performed using software.

The differential wheel slip controller 12 has input terminals 66, 68 for receiving high and low logic signals, respectively. The differential wheel slip controller 12 produces a motor current delta signal in response to a difference between the high and low logic signals. Subsequently, the differential wheel slip controller 12 produces a lagged motor current delta signal by calculating a first-order-lag of the motor current delta signal. If the motor current delta and lagged motor current delta signals differ by more than a preselected reference, the differential wheel slip controller 12 restricts the magnitude of a response loop current limit signal ILR.

A current transformer 70 is connected to the generator 18 and produces a current signal in response to an ac generator current. In the preferred embodiment the current signal is actually a dc voltage signal which is proportional to the generator current. More particularly, the current transformer 70 produces a current which is rectified and applied to a burden resistor (not shown) to produce a dc voltage signal proportional to the ac generator current. A potential transformer 72 is connected to the generator 18 and produces a voltage signal in response ac voltage potential produced by the generator 18. The voltage signal is rectified to produce a dc signal proportional to the ac generator voltage. It is apparent to those skilled in the art that the current and voltage signals could be produced directly by monitoring the rectified dc generator current and voltage with the appropriate circuitry.

A desired rack calculator 74 forms part of a generator control loop 75 which is used to regulate the power produced by the generator 18. The desired rack calculator 74 has input terminals 76,78,80,82,84 for receiving the response loop current limit signal, actual engine speed, generator current, generator voltage, and power signals from the differential wheel slip controller 12, the magnetic pick-up sensor 44, the current transformer 70, the potential transformer 72, and the selector sensor 30, respectively. The desired rack calculator 74 accesses formulas and tables stored in memory 38 to calculate a desired rack signal as a function of these input signals.

The desired rack signal is applied to an input terminal 86 of a rack summer 88. A rack sensor 90 detects actual rack position and produces an actual rack signal which is applied to a second input terminal 92 of the rack summer 88. The rack summer 88 produces a rack error signal $e_R$ in response to a difference between the actual and desired rack signals.

A control signal calculator 94 has an input terminal 96 for receiving the rack error signal $e_R$ from the rack summer 88. The control signal calculator 94 accesses a control signal formula in the memory 38 and uses the formula to produce a control signal $I_f$ as a function of rack error $e_R$. The control signal $I_f$ is applied to an input terminal 98 of the field current controller 24 to regulate generator power output so as to reduce the rack error $e_R$ signal to zero.

Industrial Applicability

Figure 4B:
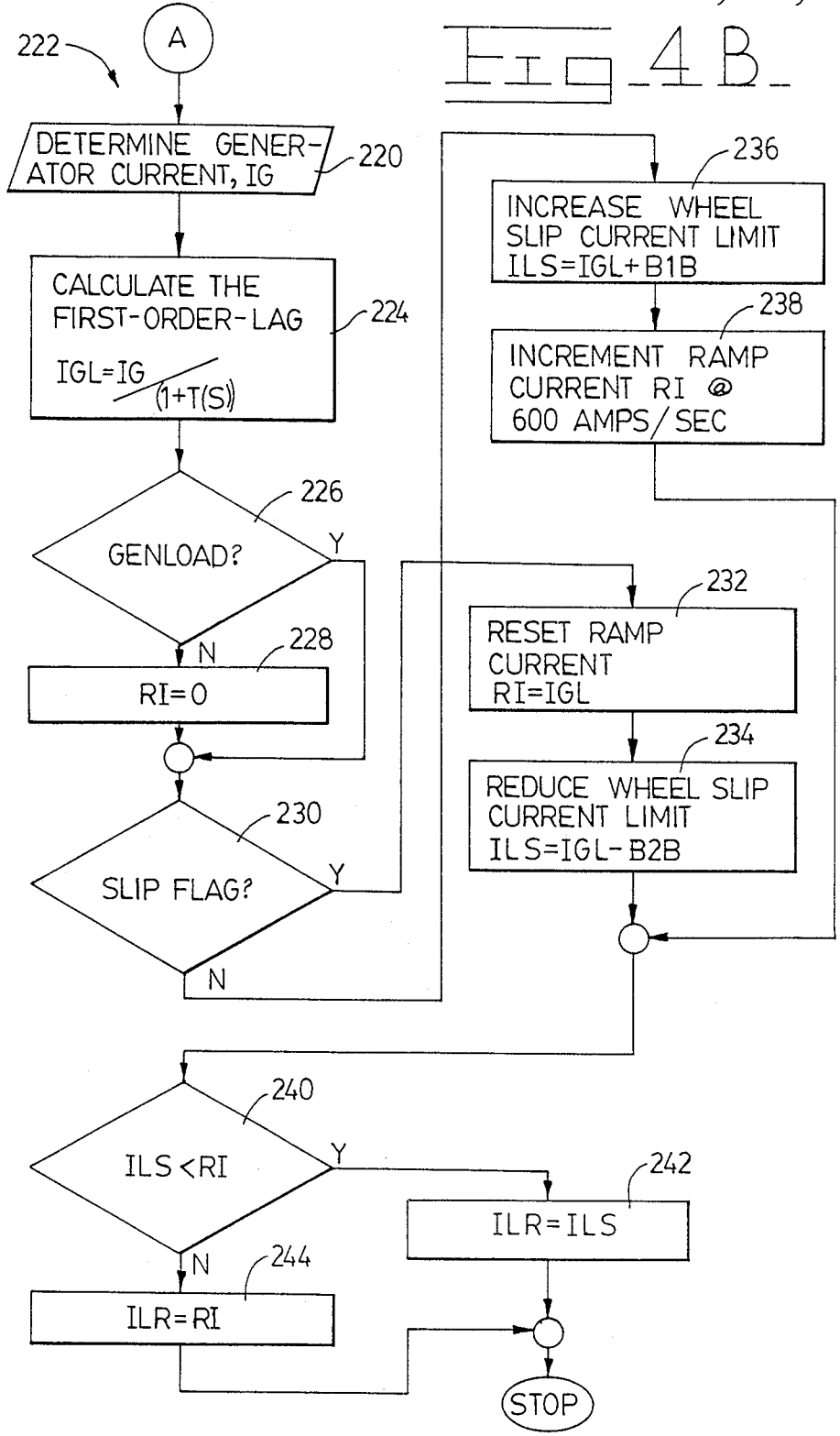

Referring now to FIGS. 4a and 4b, a subroutine used to control an embodiment of the differential slip controller 12 is illustrated by a flowchart. Initially, in the block 200, the highest and lowest motor currents IH, IL are determined by monitoring the high and low wins circuits 62, 64, respectively. In the block 202 the motor current delta DI is produced in response to the difference between the highest and lowest motor currents IH, IL.

A first-order-lag of the motor current delta is determined in the block 204 using the following Laplace transform equation:

$$DIL = DI/(1 + T(s))$$

where DIL is the lagged motor current delta, DI is the motor current delta determined in the block 202, T is an empirically derived time constant in seconds, and S is the Laplace transform operator. The software implementation of first-order-lags is commonly known in microprocessor based control systems.

A slip flag is checked in the decision block 206. Initially, the slip flag is not set; therefore, control is passed to the block 208 where the lagged motor current delta DIL is stored the variable reference motor current delta DIR. The reference motor current delta DIR is used later in the routine to determine if differential wheel slip has stopped.

Thereafter, in the decision block 210 a difference between the lagged motor current delta DIL and the motor current delta DI is compared to a first empirically determined reference B1. If the motor current delta DI is greater than the lagged motor current delta DIL by more than the first reference B1, a differential slip condition exists.

Figure 2:
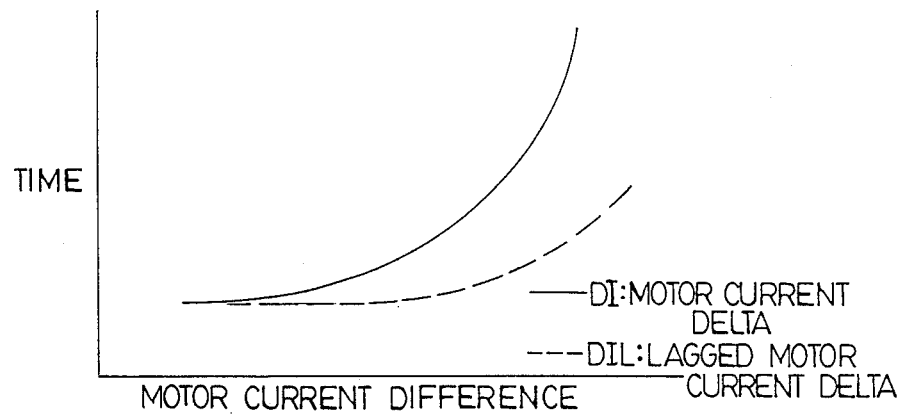
FIG. 2 is a graph of time versus the difference between highest and lowest motor currents illustrating a relationship between the motor current delta signal and the lagged motor current delta signal during differential wheel slip.

A better understanding of the relationship between the motor current delta DI and the lagged motor current delta DIL during differential slip can be gained by referring to FIG. 2. When differential slip occurs, the load on a traction motor driving the slipping axle is reduced, causing an instantaneous decrease in current through that motor. Simultaneously, the current through any motor driving non-slipping wheels increases. Therefore, if differential wheel slip occurs, the motor current delta will increase rapidly as shown by the solid line. However, the lagged motor current delta DIL will change much slower due the lag introduced by the Laplace transform equation. The difference between the motor current delta DI and the lagged motor current delta DIL is related to, and can be used as a measure of, the rate-of-change of the motor current delta DI. More particularly, as the rate-of-change of the motor current delta DI increases, the difference between the motor current delta DI and the lagged motor current delta DIL also increases. Therefore, differential slip can be detected by comparing the difference between the motor current delta DI and the lagged motor current delta DIL to an empirically determined value at which differential wheel slip occurs.

Continuing with the discussion of FIG. 4, if a differential slip condition is detected in the block 210, control is passed to the block 212 where the slip flag is set. If wheel slip is not detected in the decision block 210, control is passed to the block 214 where the slip flag is cleared.

The decision blocks 216 and 218 are used to determine if a previously detected slip condition has ended. More specifically, differential slip has stopped if both the motor current delta DI and lagged motor current delta DIL are less than the reference motor current delta DIR plus an empirically determined reference B2. If the differential wheel slip has ended, control is passed to the block 214 where the slip flag is cleared. However, if the differential slip condition still exists, control is passed to the block 212 where the slip flag is set.

Next, control is passed to the block 220 which forms part of a response loop 222. The response loop produces a response loop current limit ILR which is used later in the calculation of the control signal $I_f$. In the block 220 the generator current IG is determined by monitoring the current transformer 70. It should be noted that the generator current IG is equal to the sum of the currents through the traction motors 26a–26c. Furthermore, the generator current IG is approximately proportional to the total torque on the traction motors 26a–26c, or more specifically locomotive tractive effort.

In the block 224 a first-order-lag of the measured generator current is calculated using the following Laplace transform equation:

$$IGL = IG/(1 + T(s))$$

where IGL is the lagged generator current, IG is the measured generator current, and T is an empirically derived time constant in seconds, and s is the Laplace transfer operator. In the preferred embodiment a value of one second is chosen for T. Therefore, the lagged generator current IGL can be considered as approximately equal to the average of the total motor currents over the previous one second. Furthermore, the Laplace transform equation effectively filters noise from the generator current IG, thereby providing a more stable value from which to regulate a slip current limit ILS, as explained below.

In the block 226 the idle sensor 32 is monitored to determine if the locomotive is in an idle or load condition. If an idle condition exists, a ramp current RI is set to zero in the block 228. Under load conditions, the ramp current RI is used to ramp the control signal $I_f$ at a predetermined rate. This strategy will be explained in greater detail below.

Subsequently, the slip flag is checked in the decision block 230. If the slip flag is set, control is passed to the block 232 where a ramp current RI is reset to the lagged generator current IGL. Thus, when a slip condition ends, ramping resumes at a level equal to the lagged generator current IGL.

Thereafter, in the block 234, a slip current limit ILS is set to the lagged generator current minus a predetermined reference B2B. Under a slip condition, the slip current limit ILS is continuously reduced in this manner until the slip condition ends.

If the slip flag is not set in the decision block 230, control is passed to the block 236. In the block 236 the slip current limit ILS is set to the lagged generator current IGL plus an empirically determined reference B1B. This prevents the slip current limit ILS from being less than the ramp current RI during a non-slipping condition.

Subsequently, in the block 238 the ramp current RI is incrementally increased at a preselected rate. In the preferred embodiment a rate of 600 amps/second is used to allow the generator to reach the maximum rated current of 6000 amps over a ten second interval. As mentioned above, the generator current IG is approximately proportional to the total torque on the traction motors 26a–26c. Therefore, the rate of increase of wheel torque is limited by this ramp current rate.

Control is then passed to the block 240 where the ramp current RI is compared to the slip current limit ILS. Subsequently, the response loop current limit ILR is set to the lesser of the compared currents RI, ILS. The response loop current limit ILR is used later in the calculation of the control signal $I_f$. More particularly, when wheel slip occurs the slip current limit ILS limits the response loop current limit ILR and thus the control signal $I_f$. Subsequently, the speed of the traction motors 26a–26c is incrementally reduced until differential wheel slip ceases.

Figure 3:
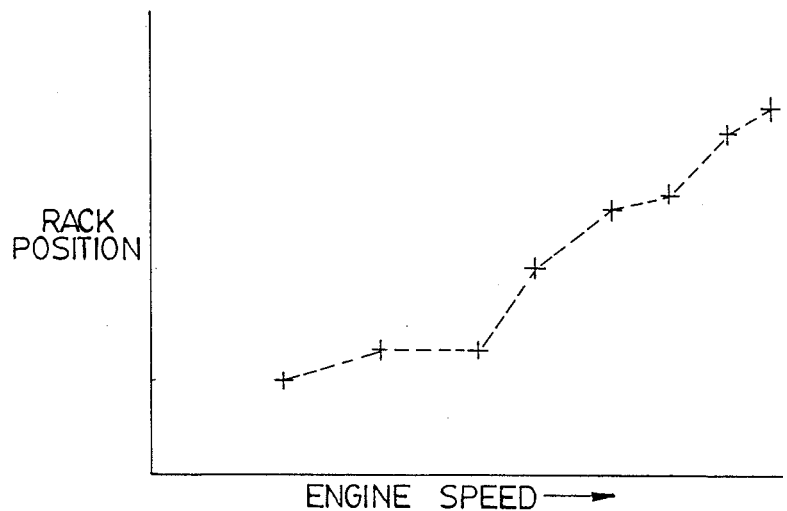
FIG. 3 is a graph of engine speed versus rack position for optimum operating efficiency of a diesel engine.

Referring now to FIGS. 5a and 5b a flowchart illustrative of software for controlling the generator control loop 75 is described. In the block 300 the actual engine speed NA is determined by monitoring the magnetic pick-up sensor 44. Thereafter, in the block 302, a first preliminary desired rack R1 is calculated as a function of the measured engine speed NA using a second look-up table stored in the memory 38. The second look-up table equates the actual engine speed to a desired rack setting as illustrated in FIG. 3.

Subsequently, in the block 304, a measured rack position RM is determined by monitoring the rack sensor 90. In the block 306, the selector voltage and current limits VL, IL are calculated as a function of the position of the power selector 28. In the decision block 310 the selector current limit IL is compared to the response loop current limit ILR. A final current limit ILF is set to the lesser of the compared current limits in the blocks 312, 314.

In the block 316, the desired rack signal RD is set to the lesser of three preliminary rack signals R1, R2, R3. The first preliminary rack signal R1 was calculated in the block 302 as a function of measured engine speed NA. The second and third preliminary rack signals R2, R3 are limited by the voltage VL and the final current limit ILF, respectively. In the block 318 a rack error $e_R$ is produced in response to a difference between the measured rack position RM and the desired rack signal RD.

Finally in the block 322, the control signal $I_f$ is calculated using a transfer function of the PID (proportional, integral, differential) type which is consistent with known control theory. More particularly the control signal is calculated using the following control signal formula:

$$I_f = K_8 * e_R + K_9 * \Delta e_R + K_{10} * \Sigma B$$

where $K_8$, $K_9$, and $K_{10}$ are empirically determined constants and $\Sigma B$ is a temporary software integrator.

The blocks 324 and 326 are optional and are used to update the main software integrator $\Sigma A$ and assure the control signal $I_f$ is valid, respectively.

In summary, when differential wheel slip occurs, the differential wheel slip controller 12 restricts the magnitude of a response loop current limit signal ILS which is used by the desired rack calculator 74 to limit the desired rack signal RD. As a result, a rack error $e_R$ occurs causing the control signal calculator 94 to reduce the control current $I_f$. In turn, the actual locomotive wheel speed is incrementally reduced until the differential slip condition is no longer detected by the differential wheel slip controller 12.

While the present invention is described for use with the microprocessor governor control 10 disclosed in Earleson et al., it is recognized that such a differential slip controller 12 could be used in combination with numerous other locomotive governors.

I claim:

1. An apparatus for controlling differential wheel slip of a locomotive having a plurality of electric traction motors powered by an engine-generator unit of the type having a field current controller, comprising:
    a motor current sensor means for sensing the current through each of said traction motors and producing motor current signals responsive to said sensed currents;
    a first comparison means receiving said motor current signals and producing a low logic signal responsive to the lowest of said motor current signals;
    a second comparison means receiving said motor current signals and producing a high logic signal responsive to the highest of said motor current signals;
    processor means for comparing said high and low logic signals, producing a motor current delta signal responsive to a difference between said high and low logic signals, processing said motor current delta signal to produce a lagged motor current delta signal, deriving a difference signal in response to a difference between said motor current delta and lagged motor current delta signals, and delivering a control signal to said field current controller in response to said difference signal being greater than a first preselected reference signal.

2. The apparatus set forth in claim 1, wherein the power produced by said engine-generator unit is controllably modified in response to said field current controller receiving said control signal.

3. The apparatus set forth in claim 2, wherein the power produced by said engine-generator unit is controllably modified such that said difference signal is reduced to a magnitude less than said first preselected reference signal.

4. The apparatus set forth in claim 1, including:
    a power selector having a plurality of power settings;
    a selector sensing means for producing a power signal in response to the position of said power selector;
    a desired speed calculator means for receiving said power signal and producing a desired engine speed signal in response to said power signal;
    a speed sensing means for producing an actual engine speed signal in response to the speed of said engine;
    a speed summer means for receiving said actual and desired engine speed signals and producing a speed error signal in response to a difference between said actual and desired engine speed signals;
    a speed controller means for receiving said speed error signal and producing a rack setting signal in response to said speed error signal;
    a rack controller means for, receiving said rack setting signal and controlling the engine speed in response to said rack setting signal;
    a rack sensing means for producing a measured rack signal in response to the position of said rack controller means;
    a differential wheel slip controller means for receiving said high and low logic signals and producing a response loop current limit signal in response to said difference signal being greater than said first preselected reference signal;
    a voltage sensing means for detecting a voltage produced by said engine-generator unit and producing a generator voltage signal responsive to said detected voltage;

a desired rack calculator means for receiving said response loop current limit signal, said generator voltage signal, and said actual engine speed signal and processing said received signals to produce a desired rack signal;

a rack summer means for receiving said desired and measured rack signals and producing a rack error signal in response to a difference between said desired and measured rack signal; and, a control signal calculator means for producing said control signal in response to a difference between said desired and measured rack signals.

5. The apparatus set forth in claim 4, wherein said processor means includes a memory, said memory having stored therein a formula including empirically derived constants associated with a given engine-generator unit and traction motor combination for calculating said control signal as a function of said rack error signal, the time rate of change of said rack error signal and the integral of several rack error signals.

6. The apparatus set forth in claim 5, wherein the power produced by said engine-generator unit is controllably modified in response to said field current controller receiving said control signal such that said rack error signal is reduced to zero.

7. The apparatus set forth in claim 4, wherein said differential wheel slip controller means produces a slip flag signal in response to said difference signal being greater than said first preselected reference signal.

8. The apparatus set forth in claim 7, wherein said differential wheel slip controller means sets a reference motor current delta signal equal to said lagged motor current delta signal in the absence of said slip flag signal.

9. The apparatus set forth in claim 8, wherein said differential wheel slip controller means:

cancels said slip flag signal in response to said difference signal being less than or equal to said first preselected reference signal; and, cancels said slip flag signal in response to said motor current delta signal being less than or equal to a sum of said reference motor current delta signal and a second preselected reference signal, and said lagged motor current wheel speed signal being less than or equal to a sum of said reference delta motor current signal and said second preselected reference signal.

10. The apparatus set forth in claim 4, wherein said desired rack calculator means produces a current limit signal in response to said power signal and limits a final current limit signal to the lesser of said current limit signal and said response loop current limit signal.

11. The apparatus set forth in claim 10, wherein said desired rack calculator means produces a voltage limit signal in response to said power signal, produces a first quotient signal in response to the quotient of said voltage limit signal divided by said generator voltage signal, produces a second quotient signal in response to the quotient of said final current limit signal divided by said produced current limit signal, produces a first preliminary rack signal in response to said engine speed signal, produces a second preliminary rack signal in response to the product of said measured rack signal and said first quotient signal, produces a third preliminary rack signal in response to the product of said measured rack signal and said second quotient signal, and limits said desired rack signal to the lesser of said preliminary rack signals.

12. A method for controlling wheel slip of a locomotive having a plurality electric traction motors powered by an engine-generator unit of the type having a field current controller comprising the steps of:

detecting a current through each of said traction motors and producing a plurality of motor current signals responsive to said detected currents;

comparing said motor current signals to produce a low logic signal responsive to the lowest of said motor current signals;

comparing said motor current signals to produce a high logic signal responsive to the highest of said motor current signals;

comparing said high and low logic signals to produce a motor current delta signal in response to a difference between said high and low signals, processing said motor current delta signal to produce a lagged motor current delta signal, indicative of a first-order-lag of said motor current delta signal;

deriving a difference signal responsive to a difference between said motor current delta and lagged motor current delta signals; and;

delivering a control signal to said field current controller in response said difference signal being greater than a first preselected reference signal.

13. The method set forth in claim 12, including producing a slip flag signal in response to said difference signal being greater than said first preselected reference signal.

14. The method set forth in claim 13, wherein a reference motor current delta signal is set equal to said lagged motor current delta signal in the absence of said slip flag signal.

15. The method set forth in claim 14, including:

cancelling said slip flag signal in response to said difference signal being less than or equal to said first preselected reference signal; and, cancelling said slip flag signal in response to said motor current delta signal being less than or equal to the sum of said reference motor current delta signal and a second preselected reference signal, and said lagged motor current delta signal being less than or equal to the sum of said reference motor current delta signal and said second preselected reference signal.

16. An apparatus for controlling wheel slip in a locomotive of the type having a plurality of electric traction motors powered by an engine-generator unit, comprising:

a power selector having a plurality of selectable positions;

a selector sensing means for producing a power signal in response to the position of said power selector;

a desired speed calculator means for receiving said power signal and producing a desired engine speed signal in response to said power signal;

a speed sensing means for producing an actual engine speed signal in response to the speed of said engine;

a speed summer means for receiving said actual and desired engine speed signals and producing a speed error signal in response to a difference between said actual and desired engine speed signals;

a speed controller means for receiving said speed error signal and producing a rack setting signal in response to said speed error signal;

a voltage sensing means for detecting a voltage produced by said engine-generator unit and producing a generator voltage signal responsive to said detected voltage;

a rack controller means for receiving said rack setting signal and controlling the engine speed in response to said rack setting signal;

a rack sensing means for producing a measured rack signal in response to the position of said rack controller means;

a motor current sensor means for sensing the current through each of said traction motors and producing motor current signals responsive to said sensed currents;

a first comparison means for receiving said motor current signals and producing a low logic signal responsive to the lowest of said motor current signals;

a second comparison means for receiving said motor current signals and producing a high logic signal responsive to the highest of said motor current signals;

a differential wheel slip controller means for receiving said high and low logic signals, producing a motor current delta signal responsive to a difference between said high and low logic signals, processing said motor current delta signal to produce a lagged motor current delta signal indicative of a first-order-lag of said motor current delta signal, deriving a difference signal in response to a difference between said motor current delta and lagged motor current delta signals, and producing a response loop current limit signal in response to said difference signal being greater than a preselected reference signal;

a current sensor means for detecting a current produced by said engine-generator unit and producing a generator current signal responsive to said detected current;

a desired rack calculator means for receiving said generator voltage signal, said response loop current limit signal, said produced generator current signal, and said actual engine speed signal and processing said received signals to produce a desired rack signal;

a control signal calculator means for receiving said desired and measured rack signals and producing a control signal in response to a difference between said desired and measured rack signals; and, a field current controller means for receiving said control signal and controlling power produced by said generator in response to said control signal.

* * * * *